Jan. 27, 1953
D. RAGLAND
2,626,788
MUD MIXER AND AGITATOR
Filed Jan. 28, 1949
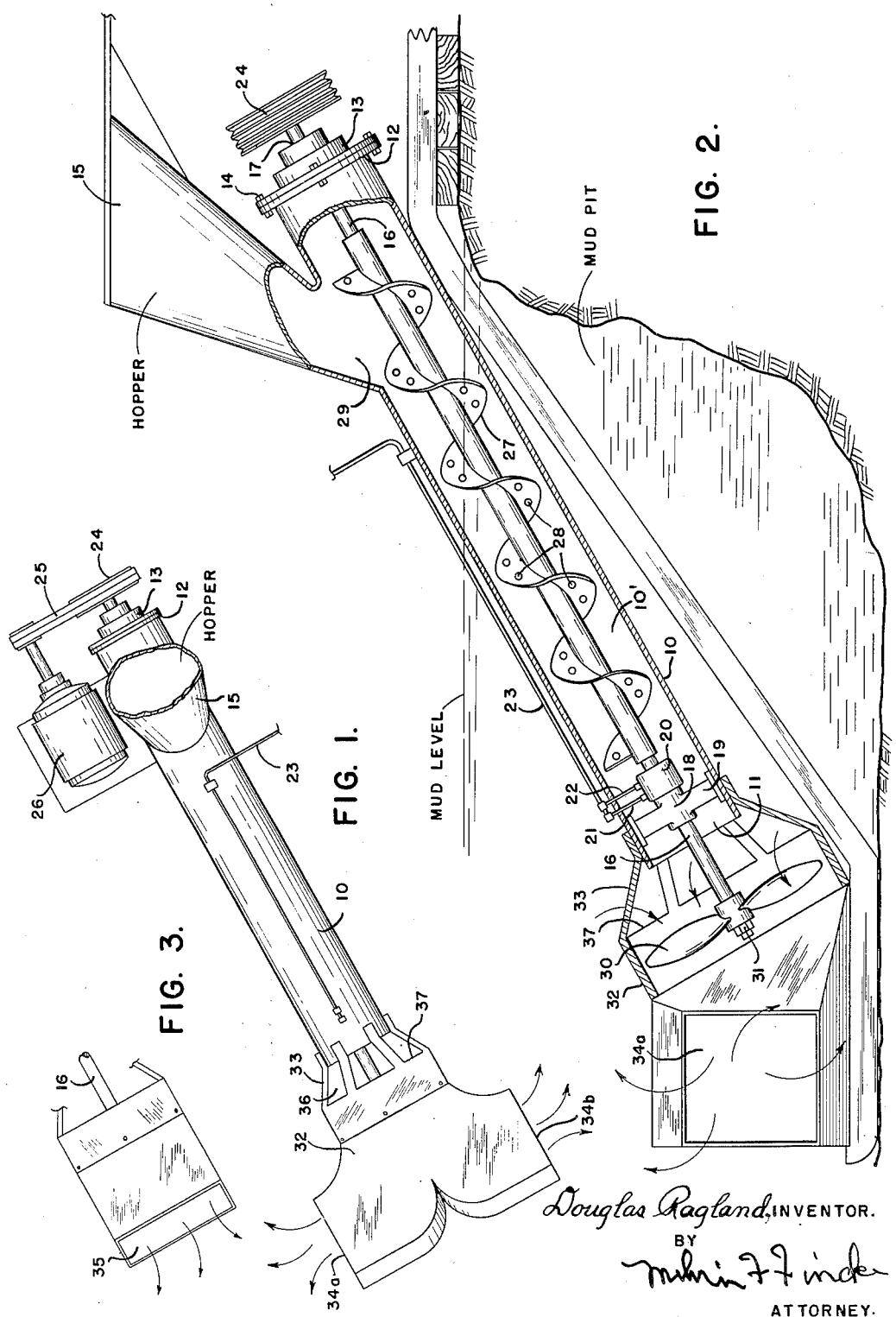
Douglas Ragland, INVENTOR.
BY
ATTORNEY.

Patented Jan. 27, 1953

2,626,788

UNITED STATES PATENT OFFICE 2,626,788

MUD MIXER AND AGITATOR

Douglas Ragland, Houston, Tex., assignor, by mesne assignments, to Standard Oil Development Company, Elizabeth, N. J., a corporation of Delaware Application January 28, 1949, Serial No. 73,417

1 Claim. (Cl. 259—97)

This invention relates to an improved apparatus for mixing the desired ingredients with drilling mud and for agitating drilling mud in a vessel.

In the drilling of oil wells by the rotary drilling method, it is common practice to circulate drilling fluid into the borehole under pressure. The drilling fluid is pumped from a pit or tank to the well, downwardly through the drill stem and out through the eyes of the bit. The mud then rises to the surface in the annular space between the drill stem and the walls of the borehole and is eventually returned to the mud tank or pit.

While in the mud pit or tank the finely divided solid materials forming an ingredient of the mud tend to settle out of the mud. If unhindered settling is permitted, the character of the drilling mud may be altered sufficiently to render it unfit for further use in the borehole. To prevent such settling stirring devices are employed. These devices are usually located at a point in the tank or pit in close proximity to the intake of the pump used to transport the mud from the pit to the well. In the past it has been common to employ mud guns for mixing the mud in the pit or tank. It is also common to employ jet mixers for incorporating the desired ingredients in drilling mud, these ingredients being incorporated for the purpose of controlling the properties of the mud. For example, it is known to add chemicals to the mud to control its viscosities and gel strength. It is also known that the specific gravity and other properties of the mud may be controlled by incorporating in the mud such materials as clay and weighting agents.

Although the jet mixers commonly used in the past for incorporating ingredients into drilling mud and the mud guns used for agitating the drilling mud vary somewhat in construction, the essential feature of these devices is a nozzle through which the drilling fluid is forced under pressure, the pressure in some instances being as great as 800 pounds per square inch. Obviously, when such pressures are maintained, the wear of nozzles is very great and frequent replacement is required. Another disadvantage in the use of devices of the aforementioned construction is the fact that a large amount of power is consumed in their operation. As a matter of fact, in the operation of a conventional drilling rig, two or three of these guns are ordinarily required and from 150 H. P. to 200 H. P. is normally required for their operation.

One of the objects of the present invention is to provide an apparatus which may be used both for incorporating ingredients into drilling mud and for agitating the mud. A further object is to provide an apparatus which may be used simultaneously as a means for incorporating ingredients into the drilling mud and as a means for agitating the mud. A still further object is to provide a mud mixer and agitator, the parts of which are not subjected, when performing their intended function, to excessive wear by the mud. Still another object of the present invention is to provide an apparatus for agitating and mixing mud having low power requirements.

Various other objects and advantages of the invention will be apparent to those skilled in the art from the following detailed description when taken in connection with the accompanying drawing in which Fig. 1 is a front view of the mixing and agitating apparatus;

Fig. 2 is a side view, partly in section, of the embodiment shown in Fig. 1, shown as it would normally be placed in a mud pit; and Fig. 3 is another embodiment of a portion of the embodiment shown in Figs. 1 and 2.

Referring to the drawing, reference character 10 designates a cylindrical member defining a central chamber 10' open at one end 11. The other end 12 of cylindrical member 10 is closed by head 13 which is secured to cylindrical member 10 by a suitable means, such as by bolts 14. Hopper 15 communicates with chamber 10' through the side wall of cylindrical member 10 and is mounted on member 10 adjacent the end 12 thereof.

Mounted longitudinally within cylindrical member 10 and axially therewith is shaft 16 which extends through port 17 defined by head 13 and exteriorly of cylindrical member 10 through open end 11. Shaft 16 is centered within cylindrical member 10 by means of bearing 18 which is spaced from cylindrical member 10 by means of brackets 19. Bearing 18 may be water cooled as by means of sleeve 20 which is adapted to receive a supply of water, or other cooling fluid through lines 21 and 22 which are connected to a source of cooling fluid by means of pipe 23. Shaft 16 is rotatable about its axis within cylindrical member 10 and may be rotated by any suitable means, such as a pulley 24, rotatable by means of a belt 25 driven by a motor 26.

Mechanically affixed to shaft 16 is screw conveyor 27 which may have holes 28 traversing the blade thereof, though said holes are not essential. Conveyor 27 extends from a point adjacent the opening 29 formed by the juncture of hopper 15 and cylindrical member 10 to a point contiguous to bearing 18. Inasmuch as bearing 18 is located in proximity to open end 11 of cylindrical member 10, the screw conveyor preferably extends for a major portion of the length of cylindrical member 10.

Propeller 30 is affixed to the end of shaft 16 which extends through open end 11, as by means of retaining nut 31. As shown most clearly in Fig. 1, shaft 16 extends beyond open end 11 of cylindrical member 10 and, consequently, propeller 30 is spaced from open end 11 of cylindrical member 10.

Propeller 30 is laterally circumscribed by diverter box 32. Diverter box 32 is open both at the end thereof adjacent end 11 of cylindrical member 10 and at its outer end and is affixed to cylindrical member 10 by means of spaced braces 33. In the embodiment shown in Figs. 1 and 2 diverter box 32 is shown as having dual openings 34-a and 34-b which are spaced diametrically opposite each other. The embodiment of diverter box 32 shown in Fig. 3 has only one opening 35. It will be noted that diverter box 32 is so spaced from cylindrical member 10 by means of braces 33 as to provide an open space 36 between open end 11 of cylindrical member 10 and inner end 37 of diverter box 32.

When it is desired to employ the device of my invention for agitating drilling mud in a mud pit, it is inserted in the drilling mud, preferably with the longitudinal axis of cylindrical member 10 at an inclined angle with the level of the mud, closed end 12 of cylindrical member 10 and hopper 15 being above the level of the mud with open end 11 of cylindrical member 10 being submersed beneath the surface of the mud. In this position drilling fluid is free to fill diverter box 32 and partially to fill chamber 10' of cylindrical member 10. Shaft 16 is rotated by motor 26. Rotation of shaft 16 produces corresponding rotation of screw conveyor 27 and propeller 30. Rotation of propeller 30 causes mud to be drawn into diverter box 32 through space 36 between inner end 37 of diverter box 32 and open end 11 of cylindrical member 10, as indicated by the arrows, and to flow out of the diverter box 32 through lateral openings 34-a and 34-b in the embodiment shown in Figs. 1 and 2 or through opening 35 in the embodiment shown in Fig. 3. Bearing 18 may be cooled by introducing water into sleeve 20 through lines 21, 22 and 23. The water introduced through these lines escapes through the space between sleeve 20 and the outer surface of bearing 18. When it is desired to incorporate ingredients into the drilling mud at the same time as the mud in the pit is agitated, the ingredients are introduced into chamber 10' of cylindrical member 10 through hopper 15. The ingredients so introduced are carried by screw conveyor 27 to open end 11 where they are picked up and carried into diverter box 32 by the drilling fluid drawn in through space 33. The drilling mud and the added ingredients are, of course, emitted, after being thoroughly admixed by propeller 30, through outlets 34-a and 34-b of the embodiment shown in Figs. 1 and 2 or through outlet 35 when the embodiment of Fig. 3 is employed.

It has been found that the aforedescribed apparatus will satisfactorily agitate the mud in the mud pit of a conventional drilling rig and will also satisfactorily incorporate the ingredients which must be added to the mud from time to time as satisfactorily as can be accomplished by the use of more conventional equipment. It has further been found that the aforementioned agitation and mixing can be accomplished with a fractional amount of the horsepower consumed by the more conventional equipment. As a matter of fact, the device of my invention, when powered with a 10 H. P. motor, will accomplish approximately the same work accomplished when expending 150 H. P. to 200 H. P. with conventional equipment.

It will be understood that various changes and modifications may be made without departing from the spirit of my invention and all such changes and modifications are intended to be included within the scope of the appended claim.

What I wish to claim as new and useful and to secure by Letters Patent is:

Apparatus for incorporating ingredients into drilling fluid in a retaining vessel and for agitating the drilling fluid in said vessel comprising a cylindrical member having an open end and a closed end and defining a chamber, said cylindrical member being adapted to be partially submerged in drilling fluid with its closed end above the level of the fluid, a hopper mounted on said cylindrical member in inclined relationship to the longitudinal axis of the cylindrical member to define therewith a first obtuse angle, said hopper communicating with said chamber adjacent the closed end of said cylindrical member, a shaft rotatably mounted within and extending longitudinally through said cylindrical member, one end of said shaft extending through the closed end of said cylindrical member and the other end of said shaft terminating exteriorly of the open end of said cylindrical member, a screw conveyor mounted in said chamber on said shaft for rotation therewith, the said conveyor being arranged with its up-stream end adjacent the closed end of said cylindrical member and its down-stream end adjacent the open end of said cylindrical member, a propeller mounted exteriorly of said cylindrical member on said shaft for rotation therewith and spaced from the open end of said cylindrical member, a diverter box having oppositely disposed dual side openings adapted to divert horizontally the effluent passing therethrough, and having an open inner end, the longitudinal axis of the diverter box defining a second obtuse angle with the longitudinal axis of the cylindrical member, said box being on a horizontal plane with respect to the longitudinal axis of the cylindrical member and said first and second obtuse angles being oppositely opposed, the said box laterally circumscribing said propeller, and radially spaced members mechanically connecting said diverter box and said cylindrical member, the inner open end of said box being spaced from the open end of said cylindrical member and positioned up-stream of said propeller, the said oppositely disposed dual openings being positioned down-stream of said propeller.

DOUGLAS RAGLAND.

REFERENCES CITED

The following references are of record in the file of this patent:

UNITED STATES PATENTS

| Number | Name | Date |
|---|---|---|
| 1,129,419 | Noller | Feb. 23, 1915 |
| 1,468,581 | Steenberg | Sept. 18, 1923 |
| 1,753,716 | Owen | Apr. 8, 1930 |
| 2,358,679 | Zacher | Sept. 19, 1944 |

FOREIGN PATENTS

| Number | Country | Date |
|---|---|---|
| 376,684 | Great Britain | July 14, 1932 |
| 486,215 | Germany | Nov. 14, 1929 |